(12) United States Patent
Legan

(10) Patent No.: US 7,020,434 B2
(45) Date of Patent: Mar. 28, 2006

(54) ANIMATED RADAR SIGNAL DISPLAY WITH FADE

(75) Inventor: Lance A. Legan, Orlando, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 30 days.

(21) Appl. No.: 10/749,361

(22) Filed: Jan. 2, 2004

(65) Prior Publication Data

US 2005/0164147 A1 Jul. 28, 2005

(51) Int. Cl.
*G09B 9/54* (2006.01)
*G01S 7/40* (2006.01)

(52) U.S. Cl. .......................... 434/2; 342/169; 342/176; 342/179; 342/182; 345/428; 345/582; 345/611

(58) Field of Classification Search .................... 434/2; 342/169–172, 176, 179, 182–186; 345/428, 345/582, 611
See application file for complete search history.

(56) References Cited

U.S. PATENT DOCUMENTS

| | | | | |
|---|---|---|---|---|
| 4,016,658 A | * | 4/1977 | Porter et al. ................ | 434/41 |
| 4,228,598 A | | 10/1980 | Warner | |
| 4,493,647 A | * | 1/1985 | Cowdrey ..................... | 434/2 |
| 4,667,199 A | * | 5/1987 | Roberts ...................... | 342/169 |
| 4,944,679 A | | 7/1990 | Allen et al. | |
| 5,179,638 A | * | 1/1993 | Dawson et al. ............. | 345/582 |
| 5,409,379 A | * | 4/1995 | Montag et al. .............. | 434/2 |
| 5,528,522 A | | 6/1996 | Delguercio | |
| 5,845,874 A | * | 12/1998 | Beasley ...................... | 244/1 R |
| 6,240,341 B1 | * | 5/2001 | Snyder ........................ | 701/3 |
| 6,606,089 B1 | * | 8/2003 | Margadant .................. | 345/419 |
| 6,670,908 B1 | * | 12/2003 | Wilson et al. ............. | 342/26 R |
| 6,683,609 B1 | * | 1/2004 | Baron, Sr. et al. .......... | 345/419 |
| 6,747,649 B1 | * | 6/2004 | Sanz-Pastor et al. ........ | 345/428 |
| 6,903,752 B1 | * | 6/2005 | Ebersole et al. ............ | 345/632 |
| 2003/0184563 A1 | * | 10/2003 | Wiant, Jr. ................... | 345/629 |
| 2004/0169663 A1 | * | 9/2004 | Bernier ....................... | 345/629 |

OTHER PUBLICATIONS

Ben Humphrey, MotionBlur OpenGL Tutorial, Feb. 27, 2002, published on www.gametutorials.com at www.gametutorials.com/download/opengl/motionblur=ogl.zip.
OpenGL, Open Graphic's Library API and documentation www.opengl.org.

* cited by examiner

*Primary Examiner*—John B. Sotomayor
(74) *Attorney, Agent, or Firm*—Eliot Abolafia

(57) ABSTRACT

An exemplary embodiment of the invention relates to a computer-based program and system for displaying visually realistic raw radar signals. The computer program includes a RADAR display fade algorithm. The algorithm includes alpha blending and texture mapping for producing a slow fade. Use of two buffers and transfer of data between the buffers to produce a smooth update of the visual display while the sweep of the RADAR ray advances and new or updated RADAR contacts are displayed.

14 Claims, 9 Drawing Sheets

FIG 4b

| RadarFrontEnd |
|---|
| - bRotate : bool<br>- bClearDisp : bool<br>- bStopRendering : bool<br>- bStandby : bool<br>- iLinearSize : GLuint<br>- cxCenter : float<br>- cyCenter : float<br>- lSweepAngle : float<br>- lAlphaFade : float<br>- lSweepIncrement : float<br>- lRange : float<br>- lGainFactor : float<br>- hpTextures[10] : GLuint<br>- lpSweepTexture[128][4] : GLfloat<br>- uipRenderTexture[65536][3] : GLuint<br>- pRadarBackEnd : *RadarBackEnd<br>- pRadarCfg : *RadarCfg<br>- pFirstNtt : *CobjSpec |
| + RadarFrontEnd(pConfig: RadarCfg, pBackEnd: RadarBackEnd,<br>    cxWidth: GLint, cyHeight: GLint) : void<br>+ ~RadarFrontEnd() : void<br>+ renderScene() : void<br>+ updateParameters() : void<br>+ pauseRendering() : void<br>+ continueRendering() : void<br>+ getHeloYaw() : void<br>- orthoMode(xLeft: GLint, xRight: GLint, yBottom: GLint, yTop: GLint) : void<br>- perspetiveMode() : void<br>- createSweep(uiTextureID: GLuint, lxCenter: GLfloat, lyCenter: GLfloat,<br>    lzCenter:GLfloat, lxWidth: GLfloat,lyLength: GLfloat,lzHeight: GLfloat) : void<br>- createTexture(uiTextureID: GLuint) : void<br>- renderMotionBlur(uiTextureID: GLuint) : void<br>- renderHeloSymbol() : void<br>- drawBlip(): void |

| RadarCfg |
|---|
| - iModeSpeed : UINT<br>- iRcvrGain : UINT<br>- iStab : UINT<br>- iEraseGPI : UINT<br>- iPersist : UINT<br>- iRange : UINT<br>- cxHelo : UINT<br>- cyHelo : UINT<br>- cyHeloOffset : UINT |
| + RadarCfg(rModeSpeed: UINT, rRcvrGain: UINT, rStab: int, rEraseGPI: int, rPersist: UINT, rRange:UINT, rXPos: UINT, rYPos: UINT, rYOffset: UINT) : void<br>+ setModeSpeed(rParam: UINT) : void<br>+ setRcvrGain(rParam: UINT) : void<br>+ setStab(rParam: UINT) : void<br>+ setEraseGPI(rParam: UINT) : void<br>+ setPersist(rParam: int) : void<br>+ setRange(rParam: UINT) : void<br>+ setHeloXPos(rParam: UINT) : void<br>+ setHeloYPos(rParam: UINT) : void<br>+ setHeloYOffset(rParam: UINT) : void<br>+ getModeSpeed() : UINT<br>+getRcvrGain() : UINT<br>+ getStab() : UINT<br>+ getEraseGPI() : UINT<br>+ getPersist() : UINT<br>+ getRange() : UINT<br>+ getHeloXPos() : UINT<br>+ getHeloYPos() : UINT<br>+ ~RadarCfg() : void |

ANIMATED RADAR SIGNAL DISPLAY WITH FADE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE OR A COMPUTER PROGRAM LISTING APPENDIX SUBMITTED ON A COMPACT DISC

Not Applicable

BACKGROUND OF THE INVENTION

1. Field of the Invention

This invention relates to the field of RADAR simulation devices and more particularly to visual RADAR displays.

2. Description of the Related Art

This invention relates generally to simulation graphics and more particularly to a method and a system for simulation of a display of raw RADAR data.

Visual Radar displays are well known. From the time of the first RADAR to the present state of the art, it has been essential that the output of RADAR antenna signals be capable of human interpretation. Screens that have illumination properties, such as oscilloscopes, have long been used to display the processed antenna signals and to provide the visual man-machine interface. Today these screens include many models of cathode ray tubes, plasma displays and other well-known visual screens that receive and display electronic signals.

The benefits of RADAR technology have been experienced in multiple environments and now RADAR is used in a multitude of applications. For example, RADAR is used at airports to coordinate aircraft. It is used on aircraft, ships, shore installations and space vehicles to locate objects and calculate their location and velocity vectors. It is used to identify and track weather. It has provided a tool to map the moon and obtain information on the atmosphere of Venus. The uses are many and ever increasing.

In the early days of the art, the signals received by a RADAR receiver were processed with analog technology. Recently, digital technology has been applied to the signal processing of incoming RADAR signals. The properties of analog signals are different from the properties of digital signals resulting in differences in the production of RADAR data for display.

When the RADAR receiver receives the RADAR antenna signals, the incoming RADAR antenna signals receive additional digital processing for two purposes. First, if the incoming RADAR signal is only processed for the purpose of providing a compatible display on a visual display such as an oscilloscope, the processed signal is known as a "raw" signal: The "raw" signal is therefore only processed for interface with the output device but not for machine interpretation. Second, enhanced signal processing can be applied to the incoming RADAR signal for the purpose of providing computer assisted interpretation. The display of enhanced signal processing consists of machine-interpreted objects depicted by a combination of shapes such as triangles, squares and arrows with additional alphanumeric display data.

The need for training qualified RADAR operators, who provide the human half of the man-machine interface has expanded along with the uses of RADAR technology. One of the goals in training operators includes reliable interpretation of the RADAR data as decisions, sometimes-critical decisions, must quickly be made upon the presentation of data.

In training RADAR operators the fidelity of the simulation is very important, especially when raw RADAR data is being simulated. In particular, "fade" is a characteristic of the RADAR display. "Fade" is the gradual disappearance of the image produced during sweeps of the RADAR over one or more information captures cycles. Fade is important in differentiating new data presented on the display from previous data on the display to present a dynamic representation of changes that are occurring in the environment depicted on the RADAR screen. Thus, the fidelity and conformity of the fade in the simulated RADAR display is directly correlated to the performance of the RADAR operator in the actual operating environment.

Raw RADAR software simulations utilize digital processing that incorporates palette swapping and other software techniques to perform a fade. For example, U.S. Pat. No. 4,944,679 discloses RADAR display screen phosphor decay by reducing color intensity on a color lookup table over time. These techniques typically result in a segmented, choppy, or uneven picture. Thus, existing RADAR simulations provide emulation of RADAR video, but there is a need to improve the emulation of RADAR video, and in particular raw RADAR video.

BRIEF SUMMARY OF THE INVENTION

It is an object of the invention to emulate RADAR video fade.

In one aspect of the invention a computer program for displaying visually realistic raw radar signals comprises a radar display fade algorithm wherein the algorithm includes alpha blending and texture mapping for producing a slow fade.

In another aspect of the invention a simulation system displays visually realistic raw radar signal and may communicate with a separate process in addition to a network interface. The system operates independently of any particular radar beam propagation model. The system includes a radar simulation application that further comprises a radar display fade algorithm wherein the algorithm includes alpha blending and texture mapping for producing a slow fade. In addition, the radar simulation system is controllable externally and receives data from the network interface for operating independently of any particular radar beam propagation model.

In yet another aspect of the invention a method of displaying visually realistic raw radar signals comprises defining initial conditions, clearing a back buffer, shrinking a viewport for reducing texture size, applying an initial alpha value, texture mapping a rendering to the back buffer with alpha blending, copying a present display to the back buffer, increasing a sweep angle, drawing returns on a radar sweep ray texture, and capturing a snapshot of the frame buffer into a texture.

These and other features and advantages of the present invention may be better understood by considering the following detailed description of certain preferred embodiments. In the course of this description, reference will frequently be made to the attached drawings.

BRIEF DESCRIPTION OF THE SEVERAL VIEWS OF THE DRAWING

Referring now to the drawing wherein like elements are numbered alike in the several FIGURES:

FIGS. 4a, 4b, 4c, 4d and 4e, are the Unified Modeling Language Class Diagrams of the RADAR Simulation Application.

DETAILED DESCRIPTION OF THE INVENTION

Figure 1:
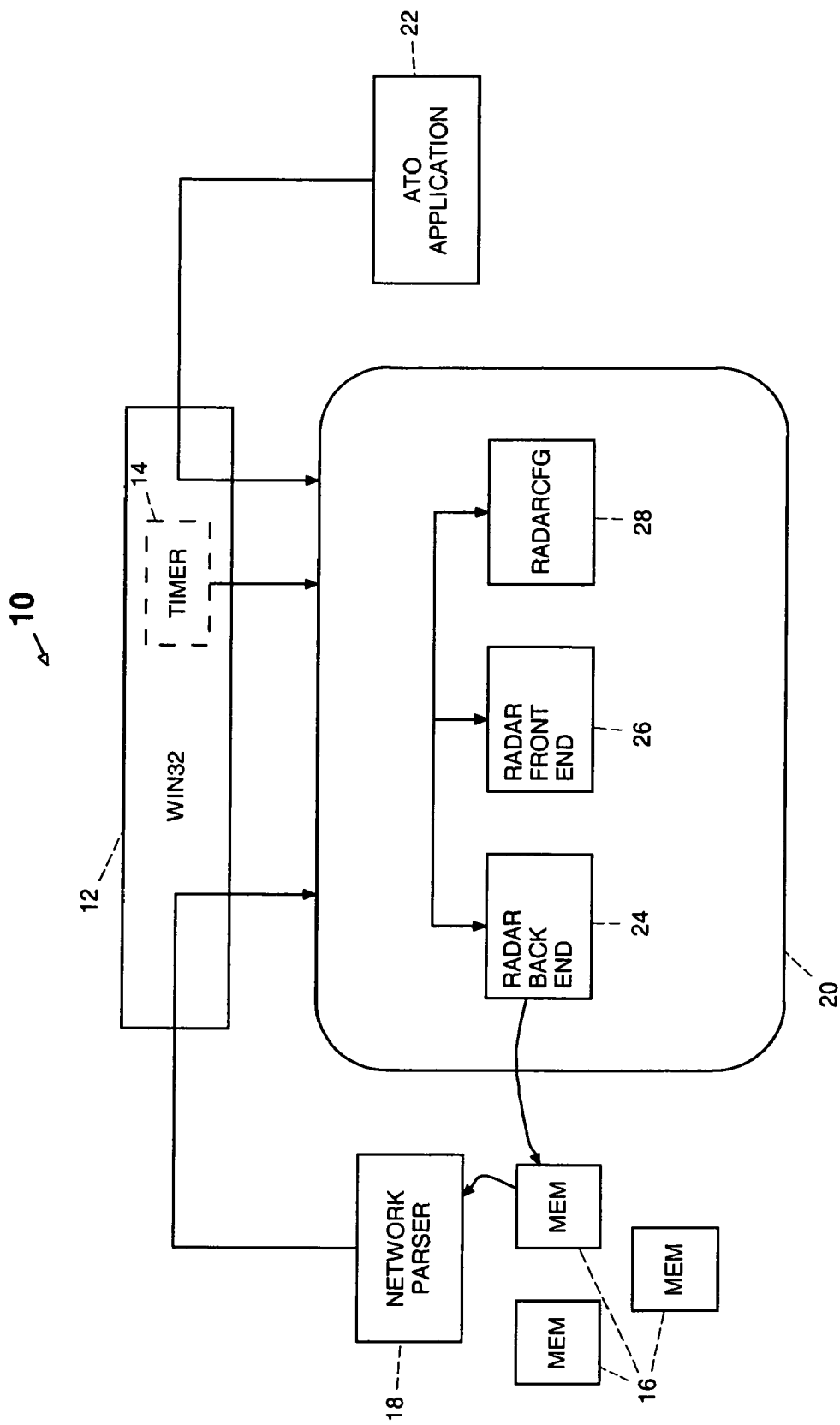
FIG. 1 is a block diagram of the relationship of the Message Passing Architecture of a present embodiment of the invention.

Referring to FIG. 1 an embodiment of a message passing architecture of a simulated RADAR system is shown generally at 10. The architecture includes a WINDOWS message-passing interface 12, which includes a timer 14. Although the present embodiment uses the WINDOWS operating system, it is within the skill of the art to select an operating system based on LINUX, UNIX or other operating system. The architecture further includes memory modules 16, a network parser 18, a RADAR simulation application 20, and an Air Tactical Officer (hereafter ATO) application 22. The RADAR simulation application receives incoming data and messages from the WINDOWS message-passing interface, the timer, the ATO application, the network parser and the memory.

The WINDOWS message-passing interface resides within the computer operating system program. The interface assists the WINDOWS operating system program by providing messages from it and other programs including RADAR target generators. As is well known in the art, some messages direct the RADAR simulation application to update an onscreen display with a display rendered from data.

The ATO application 22 adjusts operator selectable variations in the output display screen. The parameters include, brightness, contrast, angular velocity of the beam. The adjustments are made either by program algorithms or through adjustments by the human selection. As illustrated in the present embodiment, and not by way of limitation, the ATO application is included in a separate process. In addition, it is within the contemplation of the invention that the ATO application resides integrally within the RADAR simulation application. The RADAR simulation application 20 includes three integral subsystems. A subsystem is defined as a portion of the software composed of one or more classes which performs a certain task within the RADAR simulation application. A class is a software abstraction well known in the art. The three subsystems are the front end subsystem 24, the back end subsystem 26, and a configuration subsystem 28. The RADAR back end subsystem 24 catalogs and stores data which has been received and processed by the network parser 18. The configuration subsystem controls and updates the configuration parameters. The RADAR front end subsystem 26 renders display information based on information from the back end subsystem and configuration subsystem.

The RADAR application receives messages from the WINDOWS message-passing interface 12 and distributes the information received by the RADAR front end, back end, or configuration subsystems as will be described hereinafter.

Figure 2:
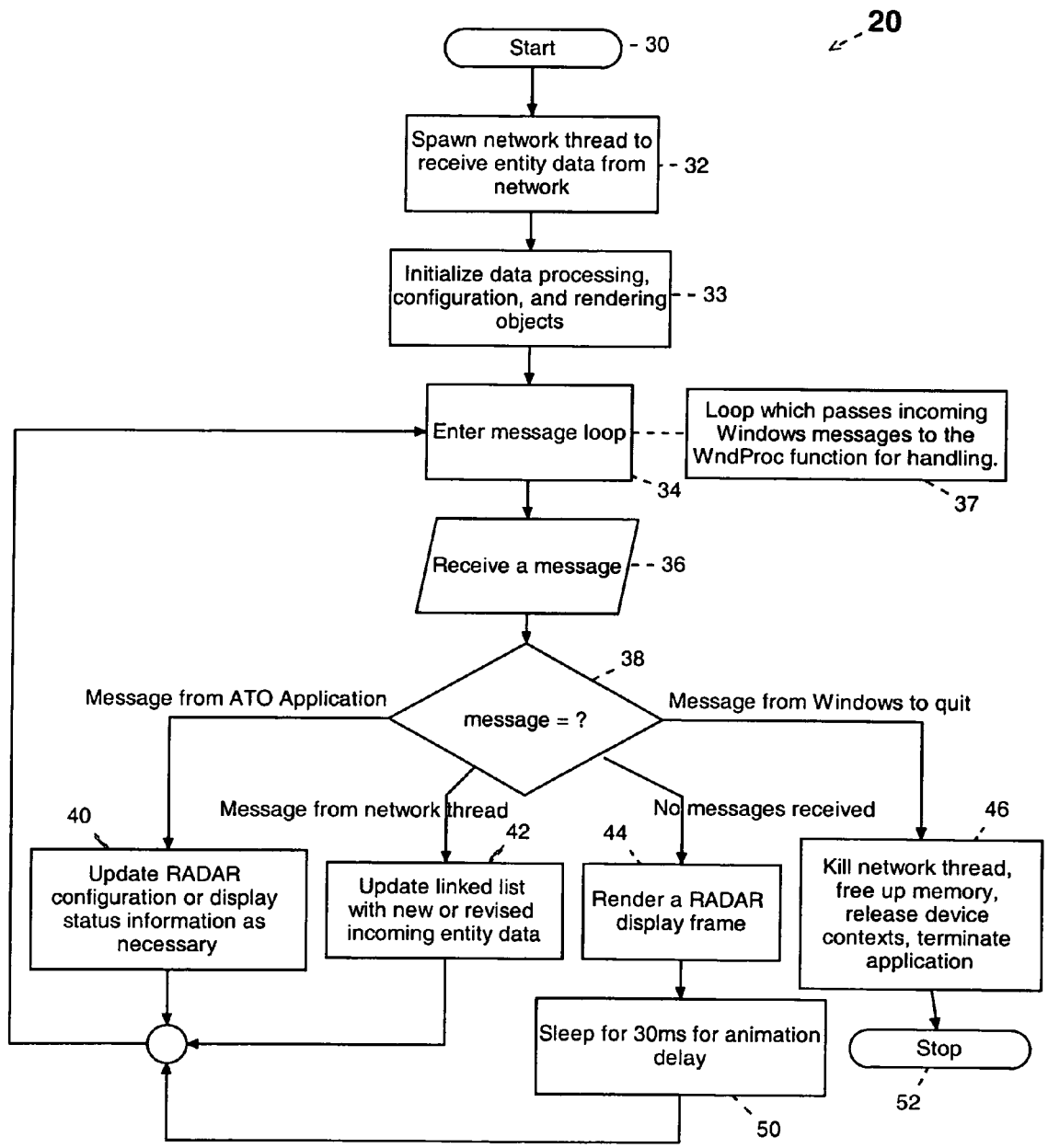
FIG. 2 is a flowchart of RADAR Simulation Application Process Flow Overview.
Figure 4A:
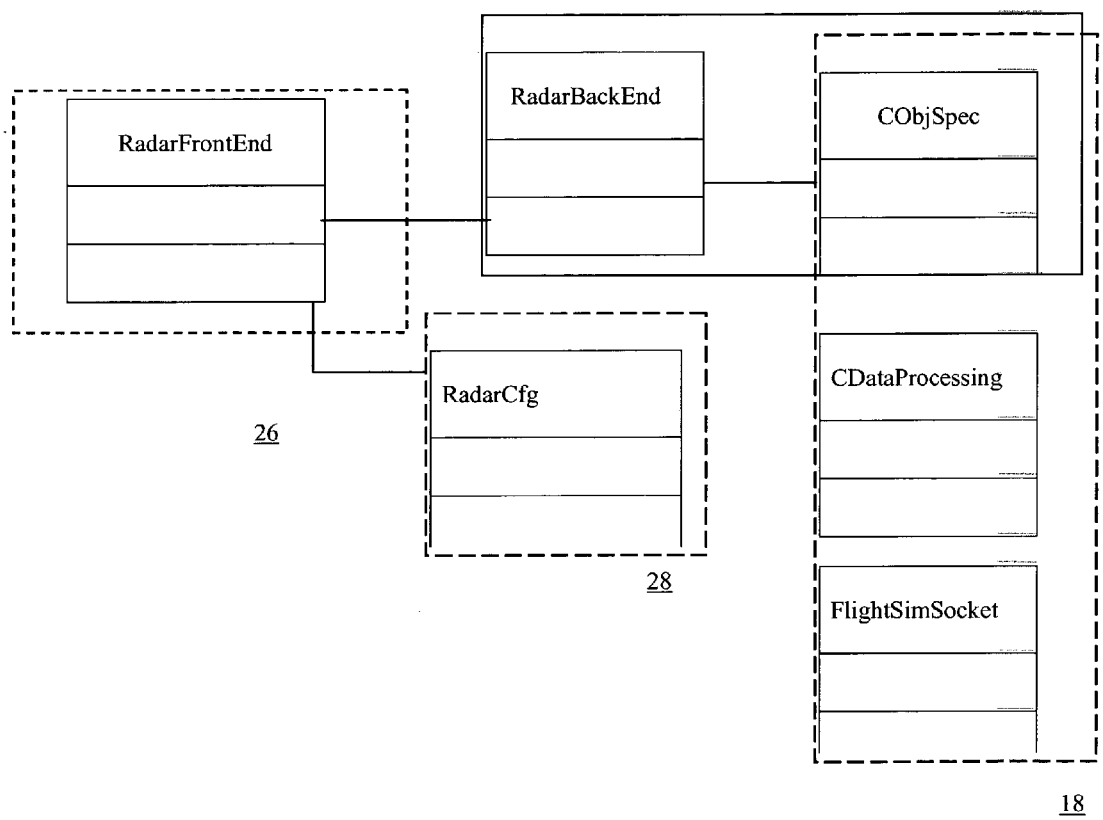
Figure 4C:
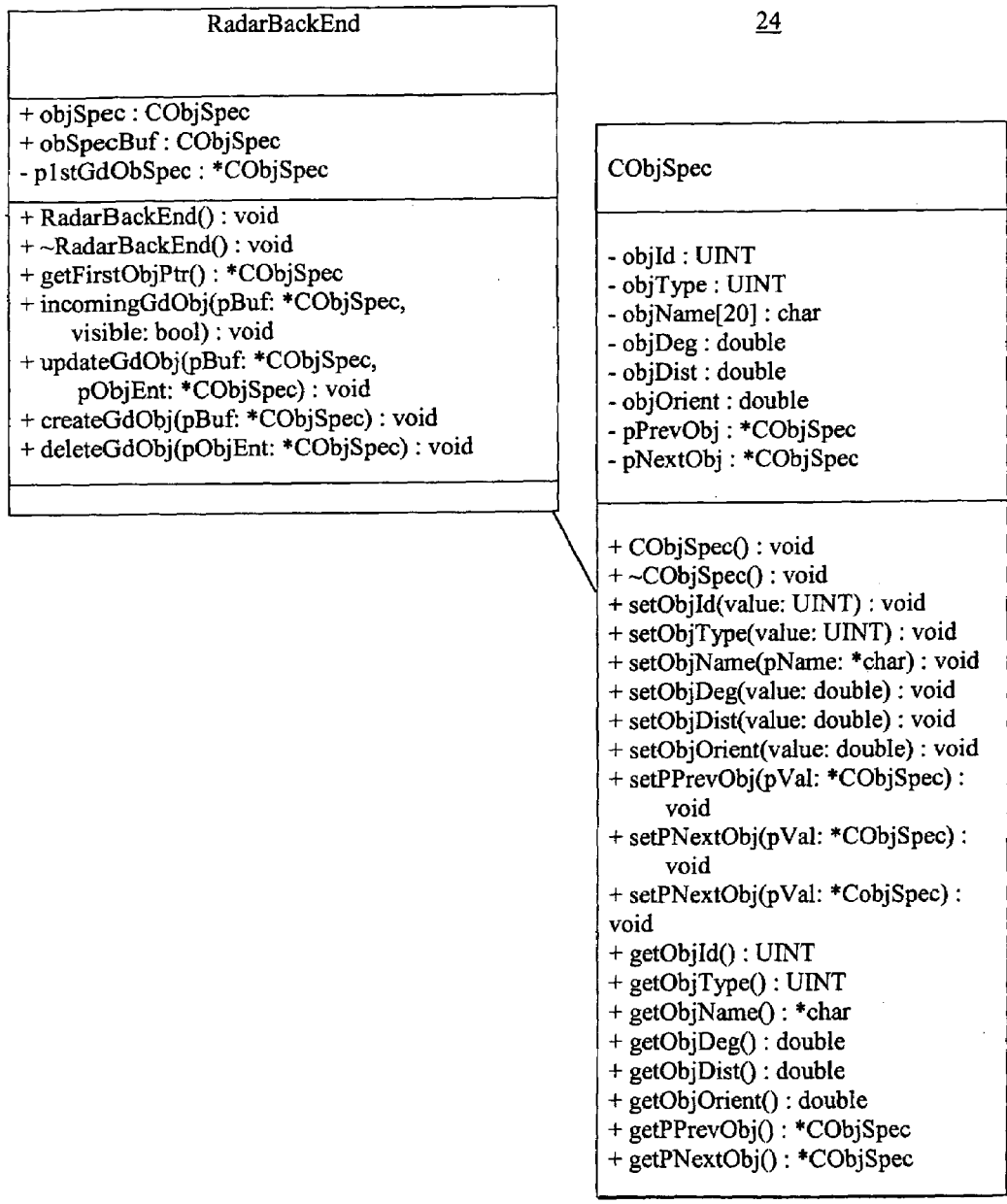
Figure 4E:
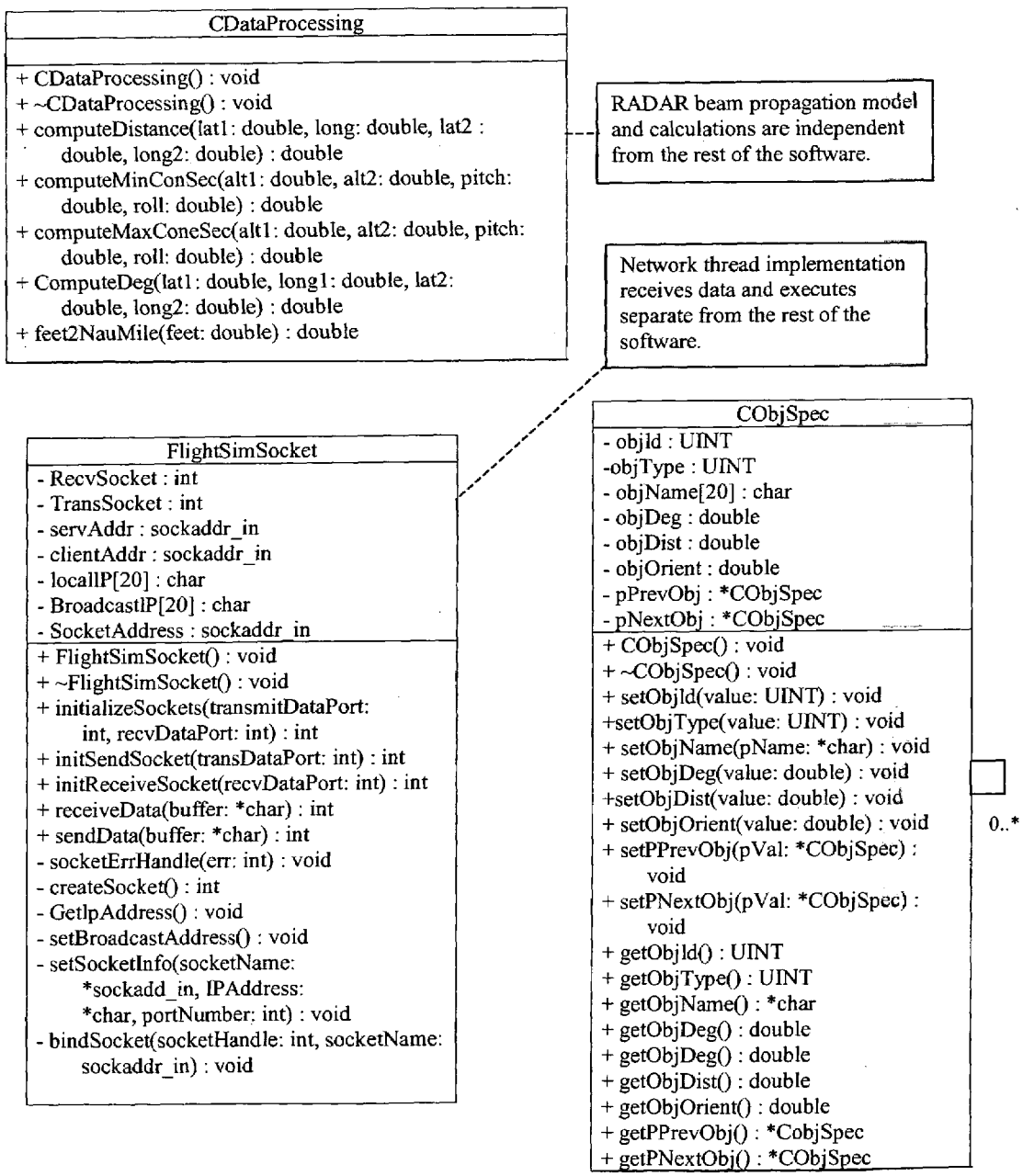

Referring to FIG. 2 and FIG. 4, the Radar simulation application will now be described. The RADAR simulation application 20 comprises the processes for translating incoming data and messages into an active raw RADAR screen simulation having a fade. Upon program startup 30, the system commences to initialize. The initialization spawns a network parsing thread 32 to receive entity data from the network, and initializes data processing, configuration, and object rendering 33. As is well known in the art, a thread is an executing process that occurs concurrently with the other program processes. Here, the thread continues to bring in new data consisting of simulated RADAR object echoes from the network as the network makes the data available from other sources such as simulator programs or operational RADAR systems. The data from the thread and configuration file are received by the message loop port of entry 34. The initialization also initializes data processing of the data collected by the thread, reads configuration file data and initiates object rendering. The data from initialization is sent to the message loop port of entry 34.

The comparison routine 36 receives data from the thread, data from configuration and rendering, and messages from the WINDOWS message passing interface 37. The messages are then processed by the message decision subroutine 38 to determine the actions to be taken.

The message decision subroutine 38 receives all messages and selects one of four actions. First, a message from the WINDOWS operating system to quit kills the network thread, and initiates orders to free up memory, release device contexts and terminate the RADAR simulation application 46 resulting in a stop command 52. Second, a message from the ATO application will order an update of RADAR configuration or display status information 40. A message from the network thread will order an updated linked list with new or revised incoming object data 42. If no messages are received then the result is an order to render a RADAR display frame 44. After a time delay for animation 50, here 30 ms for illustration and not by way of limitation, the order to render a RADAR display frame is sent to the message loop port of entry 34. The majority of software messages will be no messages received. The 30 ms results in a refresher cycle that has been shown to be adequate for animation continuity although delays outside this range are well known.

Although the ATO application can exert control over the RADAR by passing configuration and status change information by communicating messages to the RADAR, the RADAR application will function without an ATO application.

The RADAR Display Fade Algorithm Using Alpha Blending and Texture Mapping will now be described. The RADAR Display Fade Algorithm resides within the Radar Simulation Application (see FIG. 2). The algorithm uses alpha blending and texture mapping to draw the RADAR and implement the progressive fade to simulate a slow fade. Texture mapping is a technique of applying an image over a geometric primitive. Alpha blending is a method for dealing with mixing images by utilizing characteristics of transparent surfaces with different degrees of transparency to create blended images. Alpha blending mixes two images together so that one image is transparent to the other with varying degrees of transparency. The "alpha" value is a measure of the quantity of light that penetrates through a particular surface. The range of alpha values is between opacity of 0 (zero) and 1 (one). An opacity of 1 defines a completely opaque surface that blocks all incident light. A surface with an alpha value of 0 (zero) is completely transparent. The transparency or translucency of a surface is thus (1 minus alpha). Using alpha blending the program implementing the RADAR Display Fade Algorithm controls the alpha value for each pixel thereby blending or composting two figures together to create a dynamic fade.

Figure 3:
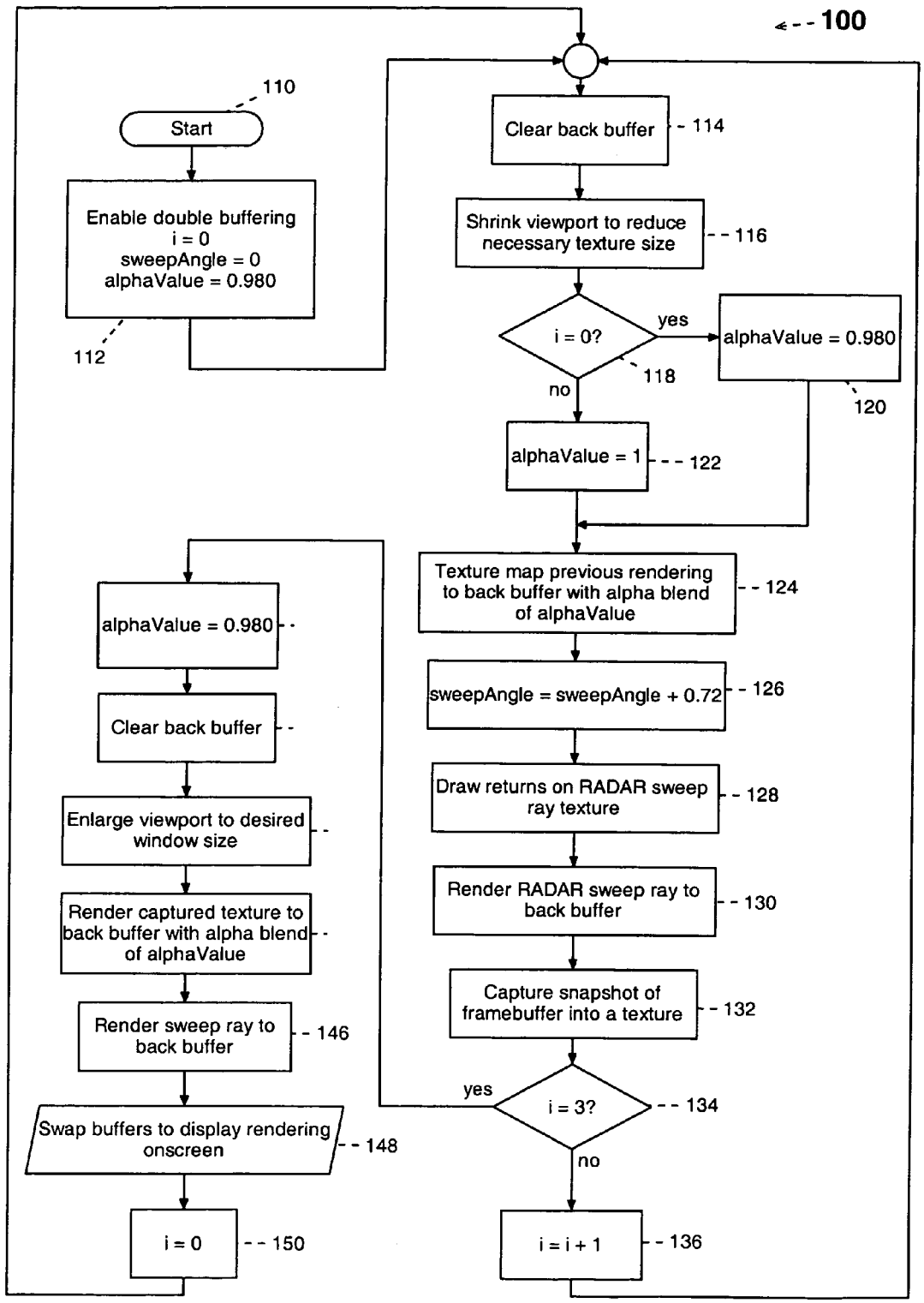
FIG. 3 is a flowchart of the RADAR Display Fade Algorithm using Alpha Blending and Texture Mapping.

Referring to FIG. 3, a flow diagram for the RADAR Display Fade Algorithm is shown at 100. At program start 110 the algorithm enables three initial conditions 112: the sweep angle is set at 0 (zero) degrees, double buffering is initiated with i=0 and an alpha value is set =0.980. The sweep angle measures the rotation of the RADAR ray in degrees from the 12-O-Clock position of the onscreen RADAR display.

Double buffering is a graphics technique for smoothing out flicker and is well known in the art. Double buffering uses a front buffer and a back buffer wherein data processing takes place on the back buffer and then swapped with a front buffer to display the processed data onscreen. The back buffer is the buffer that the data is being drawn to and is off-screen. The double buffering subroutine is normally provided with the graphics and application program interfaces (API's). In the illustrated embodiment, the sweep angle is the current angle of sweep of the RADAR beam at the 12-O-Clock position although other beam orientations may be used at the program start. The alpha value determines the fade rate of the display as described hereinabove and is adjustable. In the embodiment shown an alpha value of 0.980 has produced the best results although it can be expected that other alpha values will produce reliable results in different embodiments and according to different preferences.

The back buffer is cleared of data 114 and the back buffer view-port is shrunk to reduce the necessary texture size 116. The view port is defined as the area that is seen on the computer screen. The view port area is shrunk off screen in order to reduce the data that must be processed by the computer thereby speeding up the processing with the data off screen. The value of "i" varies from 0 to 3 to render the initial data through the RADAR display algorithm process loop three times to produce each new onscreen image. The image is redrawn onscreen thirty times per second, a rate that provides simulation fidelity to the visual senses although other values may be selected that produce adequate fidelity. At "i" set equal to 0 (zero) 118 alpha will be set equal to its initial value 120. Here, alpha is set at 0.980. If "i" is equal to 1, 2, or 3 then alpha will be set at a value to provide no blending 122. Here, the no blending value of alpha is set at 1.0. The no blending value of alpha is used during "i"=1,2,3 because when used in the fade algorithm, the combination of parameters produces the slow fade seen on RADAR screens to produce simulation fidelity for the slow fade. If the alpha value were set at a value less than 1.0 then the result would be a correspondingly more rapid fade.

The alpha value from either of step 120 or 122 is used to texture map the previous rendering of the RADAR display to the back buffer 124. The sweep angle of the RADAR sweep ray is advanced by 0.72 degrees during each advancement of integer "i." It is to be understood that unlike the texture on the remainder of the RADAR display (to be described hereinafter) the texture on the RADAR sweep ray is not affected by the alpha value. The sweep angle increment is adjustable to change the speed of the RADAR sweep to simulate the rotational speed of different RADAR antennae in different applications. With the sweep angle of the RADAR sweep ray advanced 0.72 degrees, returns are drawn on the RADAR sweep ray texture 128 and the snapshot of the frame buffer is captured into a texture 132 which will be used in the next rendering of the screen. The texture that is drawn on the RADAR sweep ray becomes the newest information displayed on the RADAR display screen. This rendering is captured in the course of the rendering algorithm and subsequently blended with the next rendering of the RADAR display to produce the fade. The processing of the subloop 136 continues until "i" is at a value for the processed data to exit the subloop 134. Here "i"=3.

When the snapshot has exited the subloop, alpha is reset 138. Here, alpha is reset to 0.980 and the back buffer is cleared 140. The viewport is enlarged to the simulated RADAR display window size 142. The captured texture 144 and the sweep ray 146 are rendered to the back buffer for advancement of the simulation. The buffers are swapped 140 to display the sub loop processed rendering onscreen. And, the value of "i" is reset to 0 (zero) 150 for continued processing of the advanced image.

Figure 5:
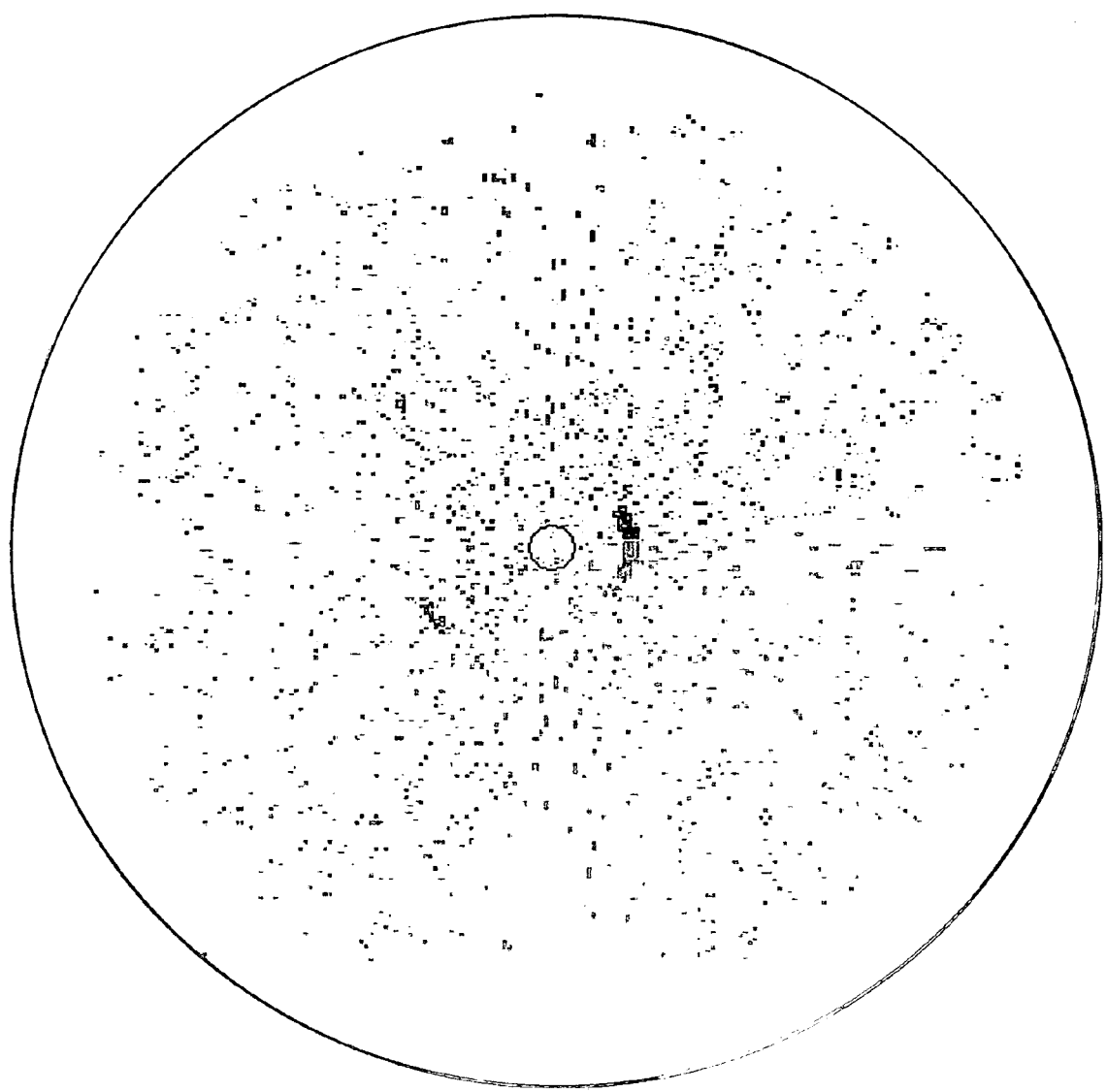
FIG. 5 is a view of a RADAR display screen.

Referring to FIG. 5 an onscreen display of the present invention by example and not by way of limitation is shown depicting the return image fade as developed at NAVAIR Orlando Training Systems Division. As demonstrated on the AirVAST SH-60B Anti-Submarine Warfare Trainer simulation, the RADAR ray has swept through a series of simulated echoes. The echoes in near trailing angular proximity to the clockwise rotating ray depict newly received returns and are brighter than the echoes displaced further distant in the counter clockwise direction from the ray. At the same instant and along any radial the older echoes are faded with respect to newer echoes as would be experienced in a conventional RADAR display. In the operational embodiment, RADAR parameters consisting of rotation speed, persistence, gain and range can be configured from a separately running process, and the data about existing entities that may generate RADAR returns is obtained from a network connection.

In operation, the RADAR application spawns a thread to monitor a network port for incoming entity data. The RADAR application then continues with initialization and then begins drawing the RADAR screen. The application continues execution according to the messages it receives through the WINDOWS message-passing interface. If a message is received from the previously spawned network thread, the new data is processed and inserted in a list so that it will be drawn on the RADAR. If a message is received from the concurrently running ATO application, the RADAR adjusts it configurable parameters according to the message received. This is how the ATO application is able to control the rotation speed, persistence, gain, and range of the RADAR. System messages are also received and processed. When there is no message waiting in the message queue, the RADAR application begins to render a display frame. Upon completion of the rendering, the frame is displayed and the process sleeps for a 30-millisecond animation delay. During testing that simulates tracking ten RADAR objects, the RADAR screen has been demonstrated to provide timely, realistic simulation fidelity.

In one aspect of using the invention, a user would review the parameters of a RADAR screen to be simulated and adjust the ATO parameters of the RADAR application to match the RADAR screen to be simulated. Next, the user would determine the goals to be accomplished during the simulation. The echoes and distances of the objects generating the echoes are incorporated into the network for input into the RADAR simulation for display during the simulation. As described, the RADAR screen is used in training RADAR operators.

In this aspect, it is also contemplated that the RADAR screen offers a realistic simulation for video gaming as well as for training. It is within the contemplation of the invention that the RADAR screen would be displayed within a representation on an output device, for instance a computer screen where the screen represents an operational environment such as the instrument panel of an aircraft pilot's cockpit or ship's bridge.

In another aspect of using the invention, raw RADAR signals representing echoes from live contacts are processed by the RADAR Display Fade Algorithm using alpha blending and texture mapping to provide additional perspective to a RADAR operator using digitally processed signals. The processed raw data provides additional information to the RADAR operator, in particular verification and validation of the digitally processed signals.

While preferred embodiments have been shown and described, various modifications and substitutions may be made thereto without departing from the spirit and scope of the present invention. Accordingly, it is to be understood that the present invention has been described by way of illustrations and not limitation.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

What is claimed is:

1. A computer program on a computer readable medium for displaying visually realistic raw radar signals comprising, a radar display fade algorithm wherein the algorithm includes alpha blending and texture mapping for producing a slow fade whereby a slow fade is rendered on a radar display screen.

2. The computer program of claim 1 further comprising:
a means for drawing returns on a radar sweep ray texture; and
a means for capturing a snapshot of a frame buffer into a texture.

3. The computer program of claim 2 wherein the radar display fade algorithm includes a means for applying an initial alpha value.

4. A simulation system displaying visually realistic raw radar signals, the system communicating with a separate process, the system communicating with a network interface and the system operating independently of any particular radar beam propagation model comprising:
a radar simulation application that further comprises a radar display fade algorithm wherein the algorithm includes alpha blending and texture mapping for producing a slow fade; and
the radar simulation system being controllable externally and receiving data from the network interface for operating independently of any particular radar beam propagation model.

5. The simulation system of claim 4 further comprising, a WINDOWS operating system, wherein the WINDOWS operating system provides the operating system for the simulation system.

6. The simulation system of claim 4 further comprising,
a front buffer,
a back buffer; and
data transfer between the back buffer and front buffer for providing alpha blending and texture mapping off screen.

7. The simulation system of claim 4, wherein the radar simulation application further comprises a display screen, an instrument panel depicted on the display screen and a radar screen is depicted on the display screen.

8. The simulation system of claim 7 wherein the instrument panel is an aircraft instrument panel.

9. A simulation system for displaying visually realistic raw radar signals, the system operating independently of any particular radar beam propagation model comprising:
a radar simulation application that further comprises a radar display fade algorithm wherein the algorithm includes alpha blending and texture mapping for producing a slow fade; and
the radar simulation system being controllable for operating independently of any particular radar beam propagation model.

10. The simulation system of claim 9 further comprising: a WINDOWS operating system, wherein the WINDOWS operating system provides the operating system for the simulation system.

11. A method of displaying visually realistic raw radar signals comprising:
defining initial conditions;
clearing a back buffer;
shrinking a viewport for reducing texture size;
applying an initial alpha value;
texture mapping a rendering to the back buffer with alpha blending;
copying a present display to the back buffer;
increasing a sweep angle;
drawing returns on a radar sweep ray texture; and
capturing a snapshot of the frame buffer into a texture.

12. The method of claim 11 wherein the initial conditions comprise: a sweep angle of about zero degrees, an "i" value equal to zero, and an alpha angle of about 0.980 degrees.

13. The method of claim 11 wherein the sweep angle is increased by about 0.720 degrees.

14. The method of claim 11 further comprising: a delay of about 30 milliseconds for animation delay.

* * * * *